(12) United States Patent
Fujita et al.

(10) Patent No.: US 7,045,180 B2
(45) Date of Patent: May 16, 2006

(54) THERMOSENSITIVE TRANSFER FILM AND METHOD OF MANUFACTURING DISPLAY DEVICE

(75) Inventors: Koji Fujita, Kanagawa (JP); Katsutoshi Ohno, Tokyo (JP); Norio Yabe, Saitama (JP)

(73) Assignees: Sony Corporation, (JP); Nippon Paper Industries Co., Ltd., (JP)

( * ) Notice: Subject to any disclaimer, the term of this patent is extended or adjusted under 35 U.S.C. 154(b) by 0 days.

(21) Appl. No.: 10/819,970

(22) Filed: Apr. 8, 2004

(65) Prior Publication Data

US 2004/0219309 A1    Nov. 4, 2004

(30) Foreign Application Priority Data

Apr. 11, 2003  (JP)  ............................ P2003-107190

(51) Int. Cl.
*B41M 5/40*   (2006.01)
(52) U.S. Cl. .................. 428/32.79; 156/237; 156/239; 428/212; 428/690
(58) Field of Classification Search ............... 156/237, 156/239; 428/32.79, 195.1, 212, 690
See application file for complete search history.

(56) References Cited

U.S. PATENT DOCUMENTS 6,040,040 A * 3/2000 Rainbow ................... 428/32.6

FOREIGN PATENT DOCUMENTS

| EP | 1 079 275 A2 | 2/2001 |
|---|---|---|
| JP | 64-7457 | 1/1989 |
| JP | 2001-043796 | 2/2001 |

* cited by examiner

*Primary Examiner*—Bruce H. Hess
(74) *Attorney, Agent, or Firm*—Rader, Fishman & Grauer PLLC; Ronald P. Kananen

(57) ABSTRACT

According to the present invention, in a thermosensitive transfer film F in which at least a fluorescent substance layer 3 and an adhesive agent layer 4 are deposited onto a base film 1, this adhesive agent layer 4 is produced by mixing at least a pigment corresponding to a color of the fluorescent substance layer 3, a thermosensitive agent and a photosensitizer. Also, a display device manufacturing method comprises the steps of forming patterning by exposure and development and using the adhesive agent layer 4 as a color filter layer after the fluorescent substance layer 3 and the adhesive layer 4 have been transferred onto the inner surface of the display panel from this thermosensitive transfer film F. Thus, in the thermosensitive transfer film in which layers are formed by the transfer process, work efficiency of the transfer process can be improved, and the sharp pattern can be formed.

8 Claims, 5 Drawing Sheets

THERMOSENSITIVE TRANSFER FILM AND METHOD OF MANUFACTURING DISPLAY DEVICE

BACKGROUND OF THE INVENTION

1. Field of the Invention

The present invention relates to a thermosensitive transfer film for use in forming a fluorescent substance layer in a display device such as a color cathode-ray tube and a method of manufacturing a display device.

2. Description of the Related Art

In recent years, as a display device comprising a color cathode-ray tube is progressively becoming large in size and its picture screen also is progressively becoming flat, a demand of improving contrast and color purity of a display device is increasing more from a quality standpoint. As an arrangement that can improve contrast of a display device, there has been proposed a method of providing a color filter layer corresponding to a fluorescent substance layer between a panel glass and the fluorescent substance layer (for example, the cited patent reference 1).

Since this color filter layer is disposed between the fluorescent substance layer of each color and the panel glass, although transmittance of light is lowered slightly, reflectance is lowered, and hence contrast ratio can be improved so that it is possible to improve color purity and contrast of the display device remarkably.

As a method of forming a color filter layer and a fluorescent substance layer on the inner surface of a panel glass, there have been proposed a slurry method and a transfer method. According to the slurry method, there is prepared slurry in which a material of a color filter layer of a fluorescent substance layer and a photosensitive component are dispersed. After this slurry has been coated on the inner surface of a glass panel, it is dried to form a layer. Further, the color filter layer or fluorescent substance layer with a predetermined pattern is formed by exposing and developing the resulting dried layer according to patterning.

On the other hand, the cited patent reference 2 discloses the transfer method. As is disclosed in the cited patent reference 2, there is prepared a thermosensitive transfer film having at least a photosensitive fluorescent substance layer, a color filter layer and a photosensitive adhesive agent layer formed on a base film. This thermosensitive transfer film is pressed against the inner surface of a glass panel by a suitable means by a roller, whereby the photosensitive fluorescent substance layer and the color filter layer are transferred to the inner surface of the glass panel and exposed and developed by patterning.

FIG. 1 of the accompanying drawings is a schematic cross-sectional view used to explain a thermosensitive transfer film according to the related art. Specifically, as shown in FIG. 1, this thermosensitive transfer film has a base film 60 serving as a supporting body on which a cushion layer 70 made of thermoplastic resin, a photosensitive fluorescent substance layer 50, a color filter layer 40 and a photosensitive adhesive agent layer 30 are formed, in that order. A cover film 80 is formed on the surface of the photosensitive adhesive agent layer 30 to protect the photosensitive adhesive agent layer 30. An antistatic layer 90 is formed on the rear surface of the base 90 in order to minimize static electricity produced when the thermosensitive transfer film is stripped from the base film 60.

[Cited Patent Reference 1]

Japanese laid-open patent application No. 64-7457

[Cited patent reference 2]

Japanese laid-open patent application No. 2001-43796

However, when the color filter layer and the fluorescent substance layer are transferred onto the inner surface of the glass panel by using such photosensitive transfer film, since this photosensitive transfer film is composed of many layers as described above, the film thickness increases unavoidably, and hence work efficiency of a transfer process is lowered. Also, when the photosensitive transfer film is exposed by patterning after the color filter layer and the fluorescent substance layer have been transferred onto the inner surface of the glass panel, exposure light has to pass through the fluorescent substance layer and the color filter layer until it reaches the photosensitive adhesive agent layer. During exposure light reaches the photosensitive adhesive agent layer through the fluorescent substance layer and the color filter, it is attenuated, and hence it becomes difficult to make sharp patterning.

SUMMARY OF THE INVENTION

It is an object of the present invention to provide a thermosensitive transfer film in which work efficiency of a transfer process can be improved and in which color purity and contrast of a display device can be improved remarkably.

It is another object of the present invention to provide a display device manufacturing method in which work efficiency of a transfer process can be improved and in which color purity and contrast of a display device can be improved remarkably.

According to an aspect of the present invention, there is provided a thermosensitive transfer film in which at least a fluorescent substance layer and an adhesive agent layer are deposited onto a base film. This thermosensitive transfer film is characterized in that the adhesive agent layer is produced by mixing a pigment corresponding to a color of the fluorescent substance layer, a thermosensitive agent and a photosensitizer.

In accordance with another aspect of the present invention, there is provided a display device manufacturing method comprising the steps of forming pattern by exposure and development after a fluorescent substance layer and an adhesive agent layer have been transferred from a thermosensitive transfer film onto the inner surface of a display panel, wherein the thermosensitive transfer film is composed of at least a base film, a fluorescent substance layer, a pigment corresponding to the color of the fluorescent substance layer, a thermosensitive adhesive agent and a photosensitizer, the adhesive agent layer transferred onto the inner surface of the display panel being used as a color filter layer.

As described above, according to the present invention, since the adhesive agent layer comprising the thermosensitive transfer film is produced by mixing at least the pigment corresponding to the color of the fluorescent substance layer, the photosensitive adhesive agent and the photosensitizer, the adhesive agent layer that is in contact with the display panel plays the role of the color filter layer. That is, the adhesive agent layer and the color filter layer can be formed as one body (single layer), and hence the thermosensitive transfer film can be decreased in film thickness. Furthermore, since the adhesive agent layer and the color filter layer are formed as one body, exposure light is attenuated by only the fluorescent substance layer, and hence sharp patterning can be made.

DESCRIPTION OF THE PREFERRED EMBODIMENTS

Figure 1:
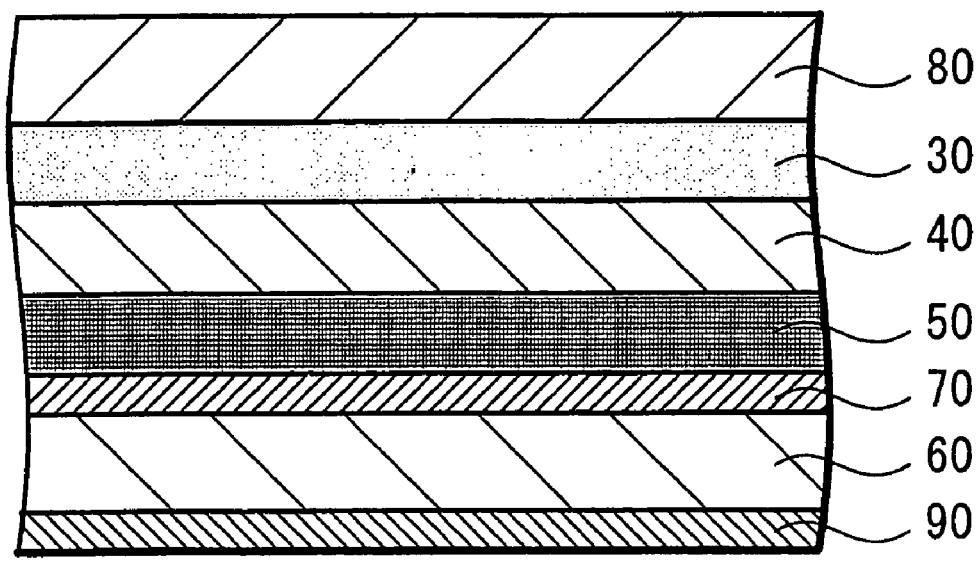
FIG. 1 is a schematic cross-sectional view useful for explaining a thermosensitive transfer film according to the related art.
Figure 2:
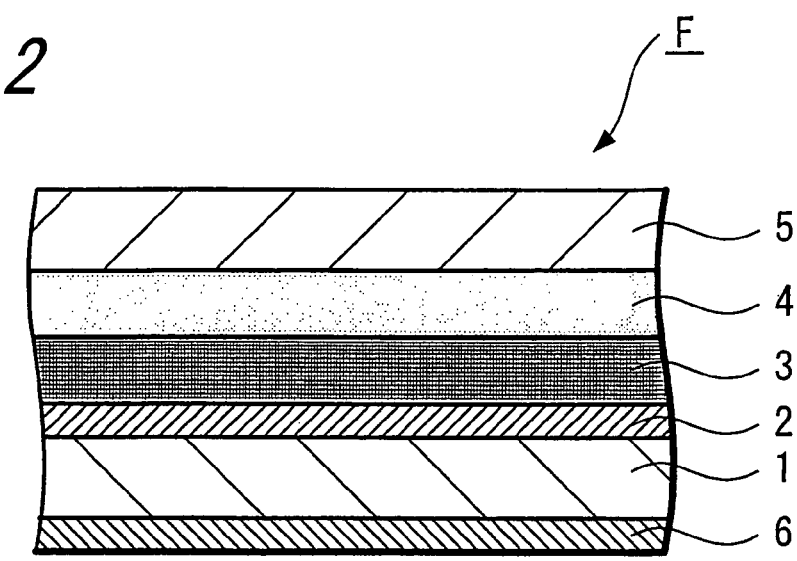
FIG. 2 is a schematic cross-sectional view useful for explaining a thermosensitive transfer film according to an embodiment of the present invention.

A thermosensitive transfer film and a method of manufacturing a display device according to the embodiments of the present invention will be described with reference to the accompanying drawings. FIG. 2 is a schematic cross-sectional view used to explain a thermosensitive transfer film according to an embodiment of the present invention. Specifically, as shown in FIG. 2, this thermosensitive transfer film F has a base film 1 on which a cushion layer 2, a fluorescent substance layer 3, an adhesive agent layer 4 and a cover film 5 are laminated, in that order. The base film 1 has an antistatic layer 6 formed on its side opposite to the side where the above-described layers 2, 3, 4, 5 are formed.

In particular, the thermosensitive transfer film F uses an adhesive agent layer that is produced by mixing at least a pigment corresponding to a color of the fluorescent substance layer 3, a thermosensitive adhesive agent and a photosensitizer as the adhesive agent layer 4. More specifically, the pigment contained in the adhesive agent layer 4 plays the role of the color filter layer, the thermosensitive adhesive plays the role of the adhesive agent used in thermal transfer and the photosensitizer plays the role of a photosensitive material used in exposure and development.

The base film 1 serves as a supporting body for supporting the respective layers and is a long-size film made of a PET (polyethylene terephthalate), for example. A film thickness of the base film 1 is properly selected so that it may not be damaged such as when it is cut by tensile force of the longitudinal direction of the film in the transfer work which will be described later on (for example, 50 to 70 μm).

The cushion layer 2 laminated on the base film 1 is provided in order to prevent the base film 1 from damaging the fluorescent substance layer 3 or the like with pressure applied thereto upon transfer work and also in order to enable the base film 1 to be easily stripped from the fluorescent substance layer 3 or the like without damaging the fluorescent substance layer 3 and the like when the base film 1 is stripped from the fluorescent substance layer 3. A film thickness of the cushion layer 2 is properly set so as to achieve the above-described objects in consideration of pressure applied to the base film 1 upon transfer work.

The fluorescent substance layer 3 is made of a fluorescent material that can emit light corresponding to blue, green and red for use in the display device and contains a photosensitive material for making patterning by exposure. A blue fluorescent substance layer 3 is made of Ag, Cl, for example, a red fluorescent substance layer 3 is made of (Y, Gd, Eu), for example, and a green fluorescent substance layer 3 is made of $(Zn, Mn)_2SiO_4$, for example. In this embodiment, the blue or green fluorescent substance layer is particularly effective as the fluorescent substance layer 3. The reason for this is that the blue or green fluorescent substance layer 3 can pass exposure light efficiently in the exposure process following the transfer process.

The adhesive layer 4 is a mixture of at least the pigment corresponding to the color of the fluorescent substance layer 3, a thermosensitive adhesive agent and a photosensitizer. This adhesive agent layer 4 can bond the fluorescent substance layer 3 and can form patterning of the color filter layer.

The cover film 5 is formed on the adhesive agent layer 4 in order to protect the adhesive agent layer 4 so that the thermosensitive transfer film F may become easy to handle. More specifically, when the thermosensitive transfer film F is conveyed, the thermosensitive transfer film F is conveyed in the state in which the cover film 5 is attached thereto in order to protect the adhesive agent layer 4. Then, immediately before the transfer work, the cover film 5 is stripped from the thermosensitive film F and thereby the adhesive agent layer 4 is exposed.

When the adhesive agent layer 4 is formed as one body with the color filter layer and has thermosensitive properly and photosensitivity as in this embodiment, the film thickness of the thermosensitive transfer film F can decrease as compared with the related art, and hence work efficiency of the transfer process can be improved considerably. In addition, since the adhesive agent layer 4 is formed as one body with the color filter layer, in the exposure process following the transfer process, exposure light is attenuated by only the fluorescent substance layer 3, thereby making it become possible to carry out sharp patterning.

Figure 3:
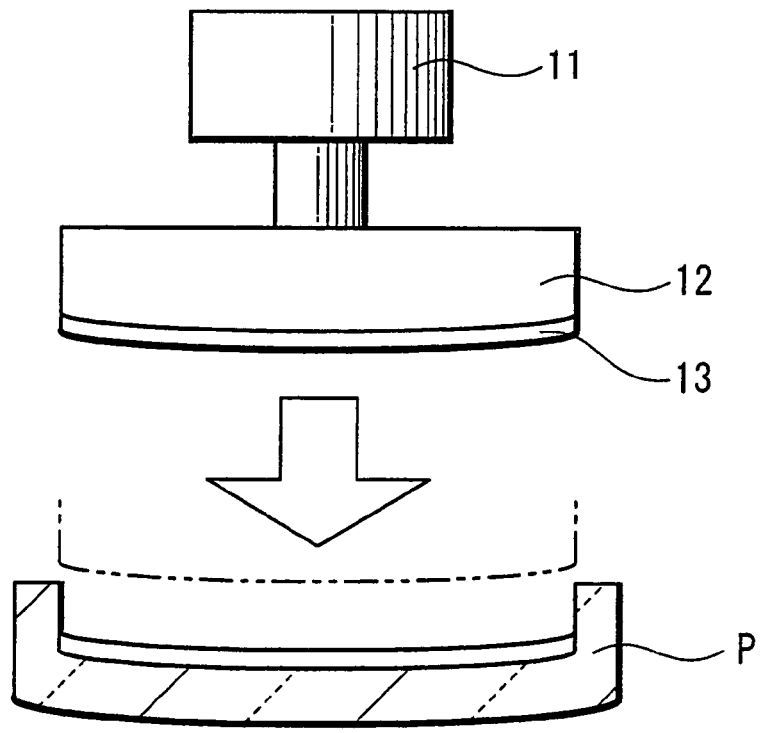
FIG. 3 is a schematic diagram showing an example of a transfer apparatus using the thermosensitive transfer film according to the embodiment of the present invention.

FIG. 3 is a schematic diagram showing an example of a transfer apparatus using the thermosensitive transfer film according to this embodiment. As shown in FIG. 3, this transfer apparatus includes a transfer head 12 attached to a press 11 and a table (not shown) for moving and holding a display panel P. The transfer head 12 has an elastic body such as a silicon rubber 13 having a thickness ranging of from 5 to 10 mm attached to its tip end.

When the thermosensitive transfer film F is transferred by this transfer apparatus, first, the display panel P is properly positioned on the table and is located under the transfer head 12 of the press 11. The thermosensitive transfer film F according to this embodiment is disposed on the inner surface of the display panel P in advance. The thermosensitive transfer film F is a sheet-like thermosensitive transfer film that has been cut in accordance with the size of the inner surface of the display panel P. The cover film 5 (see FIG. 2) is stripped from the thermosensitive transfer film F immediately before the thermosensitive transfer film F is disposed on the inner surface of the display panel P.

In this state, the transfer head 12 is lowered. The transfer head 12 is made of aluminum, for example, and has a heater embedded therein to heat (about 180° C.) the thermosensitive transfer film F. As the transfer head 12 is being lowered, the silicon rubber 13 is urged to press the thermosensitive transfer film F with predetermined pressure. With application of heat and pressure required at that time, the thermosensitive adhesive contained in the adhesive agent layer 4 (see FIG. 2) of the thermosensitive transfer film F is cured and bonded to the inner surface of the display panel P.

After the thermosensitive transfer film F has been attached to the inner surface of the display panel P, the base film 1 (see FIG. 2) of the thermosensitive transfer film F is stripped from the inner surface of the display panel P. When the base film 1 is stripped from the inner surface of the display panel P, the cushion layer 2 also is stripped from the inner surface of the display panel P together with the base film 1, and hence the fluorescent substance layer 3 is left (transferred) onto the inner surface of the display panel P through the adhesive agent layer 4. This can be realized by setting a bonding strength between the cushion layer 2 and the fluorescent substance layer 3 to become smaller than a bonding strength between the adhesive agent layer 4 and the inner surface of the display panel P. Thereafter, the adhesive agent layer 4 and the fluorescent substance layer 3 are patterned by necessary exposure and development and the display device will be manufactured.

Next, a method of manufacturing a display device (color cathode-ray tube) using the thermosensitive transfer film according to this embodiment will be described with reference to schematic cross-sectional views of FIGS. 4A to 4D, FIGS. 5A to 5C and FIGS. 6A, 6B. In these examples, the thermosensitive transfer films F corresponding to three colors of blue, green and blue are used to form the fluorescent substance layers and color filter layers of these three colors. In the following descriptions, reference numerals not shown in FIGS. 4A to 4D, FIGS. 5A to 5C and FIGS. 6A, 6B are denoted by the reference numerals in FIGS. 2 and 3 properly.

First, a black stripe-like or dot-like photoabsorption layer 2 (21) is formed on the inner surface of the display panel P. More specifically, after resist solution has been coated on the inner surface of the display panel P and then dried, the dried resist is exposed through color-selection electrode for use with the display device, for example, an aperture grille or a shadow mask, developed by warm water with a temperature ranging of from 20 to 25° C. and dried, thereby resulting in a transparent resist layer being formed at the positions corresponding to respective colors of blue, green and red.

Then, carbon slurry is coated on the transparent resist layer and dried to bond a carbon layer. Thereafter, the resulting product is rinsed by hydrogen peroxide and thereby the resist layer and the carbon layer on the resist layer are completely removed (reversal process), thereby forming the photoabsorption layer 21 with a predetermined pattern (see FIG. 4A).

Figure 4A:
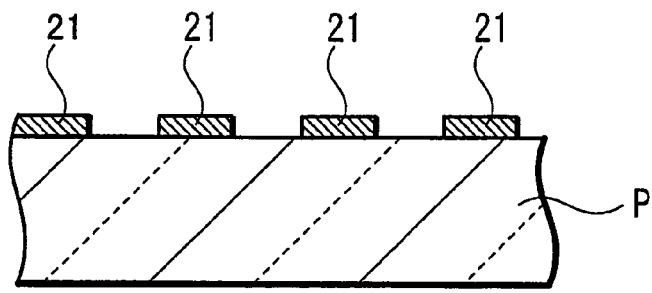
FIGS. 4A to 4D are respectively schematic cross-sectional views used to explain a method of manufacturing a display device according to the embodiment of the present invention.
Figure 4B:
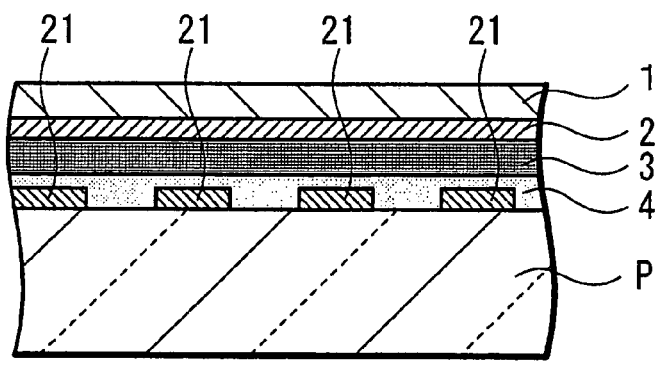

Next, the cover film 5 is stripped from the thermosensitive transfer film F for use in forming blue pixel, and as shown in FIG. 4B, the adhesive agent layer 4 and the photoabsorption layer 21 are attached to the inner surface of the display panel P so as to overlap with each other with application of heat and pressure by the transfer head 12 of the transfer apparatus. The conditions in which the adhesive agent layer 4 and the photoabsorption layer 21 are attached to the inner panel of the display panel P are such that a temperature is about 120° C. and pressure is approximately 1.3 kg/cm$^2$ (approximately 12.74×10$^4$ Pa). With application of the above heat and pressure, the thermosensitive material within the adhesive agent layer 4 of the thermosensitive transfer film F is reacted and is caused to be bonded to the inner surface of the display panel P.

Figure 4C:
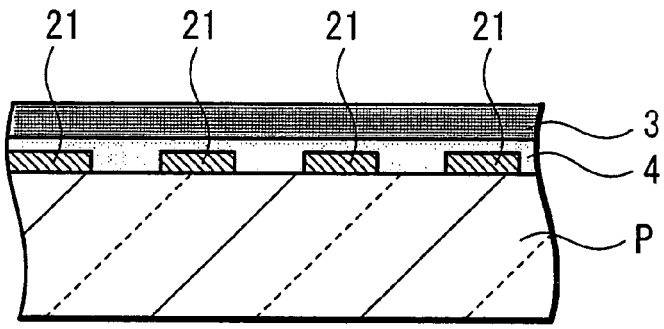

Then, the cushion layer 2 and the fluorescent substance layer 3 are detached from each other, whereby the base film 1 and the cushion layer 2 are stripped from the thermosensitive transfer film F. Thus, as shown in FIG. 4C, the fluorescent substance layer 3 is formed on the photoabsorption layer 21 through the adhesive layer 4.

Figure 4D:
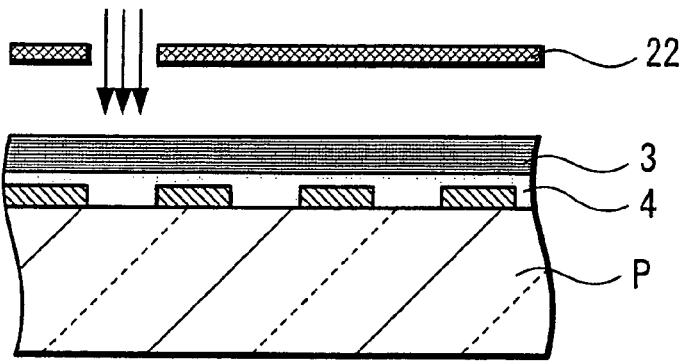
Figure 5A:
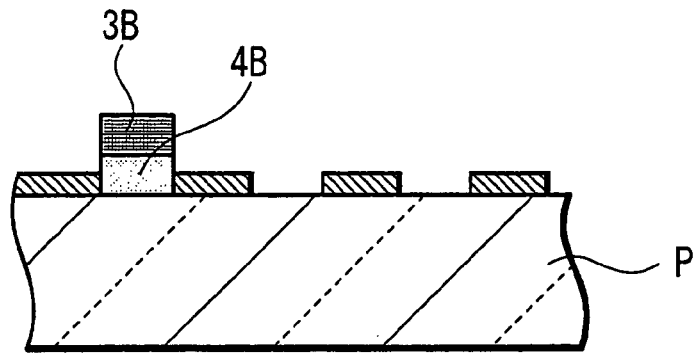
FIGS. 5A to 5C are respectively schematic cross-sectional views used to explain a method of manufacturing a display device according to the embodiment of the present invention.
Figure 5B:
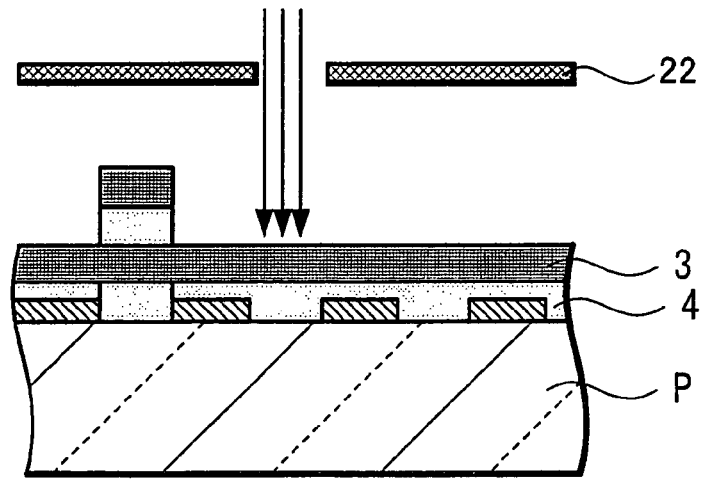

Next, as shown in FIG. 4D, the blue pixel portion is exposed from the inside (inner surface side) of the display panel P through the color-selection electrode for use with this display device, for example, an aperture grille 22. After that, the non-exposed portion is completely removed by warm water development with warm water at a temperature ranging from 20 to 25° C., for example, whereby a blue pixel composed of a blue color filter 4B and a blue fluorescent substance layer 3B is formed as shown in FIG. 5A.

In the exposure to form this blue pixel, since the pigment and the photosensitizer serving as the color filter layer are mixed into the adhesive agent layer 4, only the fluorescent substance layer 3 is located on the adhesive agent layer 4 so that exposure light can reach the adhesive agent layer 4 only through the fluorescent substance layer 3. Accordingly, attenuation of exposure light can be suppressed and sharp exposure and development can be realized.

When a green pixel is formed next, similarly, the thermosensitive transfer film F for use in forming a green pixel is attached to the inner surface of the display panel P with application of heat and pressure by the transfer head 12 of the transfer apparatus. Then, the base film 1 and the cushion layer 2 are stripped from the thermosensitive transfer film F, whereby the adhesive agent layer 4 and the fluorescent substance layer 3 corresponding to green are transferred onto the inner surface of the display panel P (see FIG. 5B).

Figure 5C:
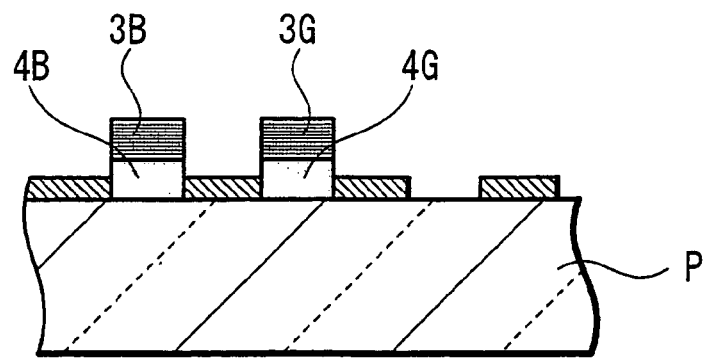

Thereafter, a green pixel portion is exposed from the inside of the display panel P through the aperture grille 22. Then, the non-exposed portion is completely removed by warm water development with warm water at a temperature ranging from 20 to 25° C., for example, whereby a green pixel composed of a green color filter 4G and a green fluorescent substance layer 3G is formed as shown in FIG. 5C.

Also in the exposure to form this green pixel, since the pigment and the photosensitizer serving as the color filter layer are mixed into the adhesive agent layer 4 in the same way as to form the blue pixel, only the fluorescent substance layer 3 is located on the adhesive agent layer 4 so that exposure light can reach the adhesive agent layer 4 only through the fluorescent substance layer 3. Accordingly, attenuation of exposure light can be suppressed and sharp exposure and development can be realized.

When a red pixel is formed, similarly to the blue pixel and the green pixel, the thermosensitive transfer film F for use in forming a red pixel is attached to the inner surface of the display panel p through the blue pixel and the green pixel with application of heat and pressure by the transfer head 12 of the transfer apparatus, and the base film 1 and the cushion layer 2 are stripped from the thermosensitive transfer film F to thereby transfer the adhesive agent layer 4 and the fluorescent substance layer 3 corresponding to red onto the inner surface of the display panel P.

Figure 6A:
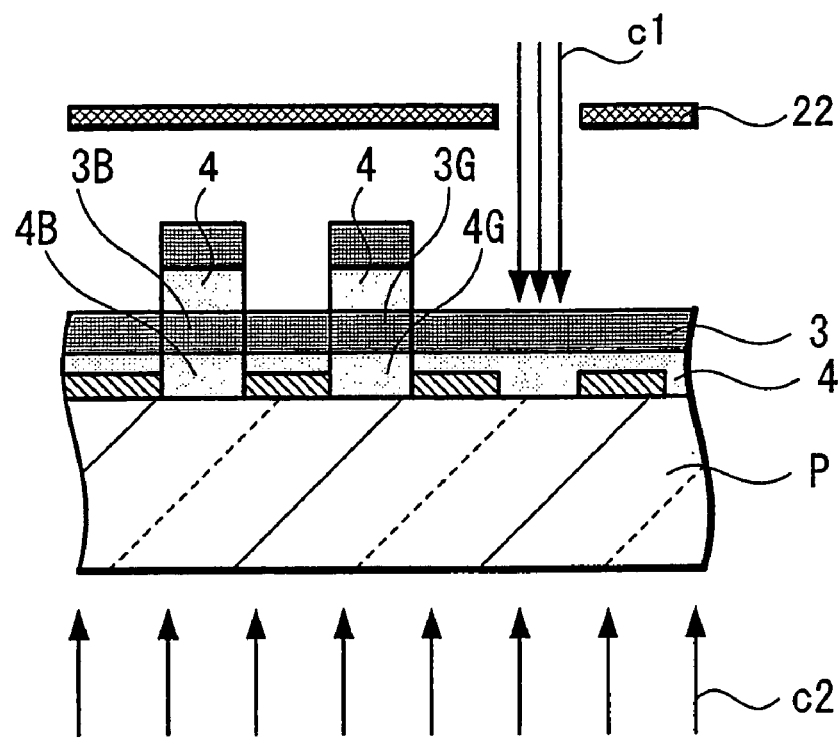
FIGS. 6A and 6B are respectively schematic cross-sectional views used to explain a method of manufacturing a display device according to the embodiment of the present invention.

In the exposure of this case, in order to absorb exposure light from the fluorescent substance layer 3, as shown in FIG. 6A, the red pixel portion is exposed from the inside of the display panel P through the aperture grille 22 by an internal exposure c1 and also the whole surface of the red pixel portion is exposed from the outside of the display panel P by an external exposure c2.

At that time, since the blue pixel and the green pixel absorbs exposure light of the external exposure c2 through the color filter layers 4B, 4G and the fluorescent substance layers 3B, 3G on the display panel P, the adhesive agent layers 4 formed on the color filter layers 4B, 4G and the fluorescent substance layers 3B, 3G are not exposed to the extent that they may be cured. Therefore, in the adhesive agent layer 4, only the red pixel portion is exposed and cured by the external exposure c2. Also, the fluorescent substance layer 3 of the red pixel portion is cured by the internal exposure cl. The red adhesive agent layer 4 and the fluorescent substance layer 3 on the color filter layers 4B, 3B and the fluorescent substance layers 3B, 3G that have already been formed are not shown in FIG. 6A.

Figure 6B:
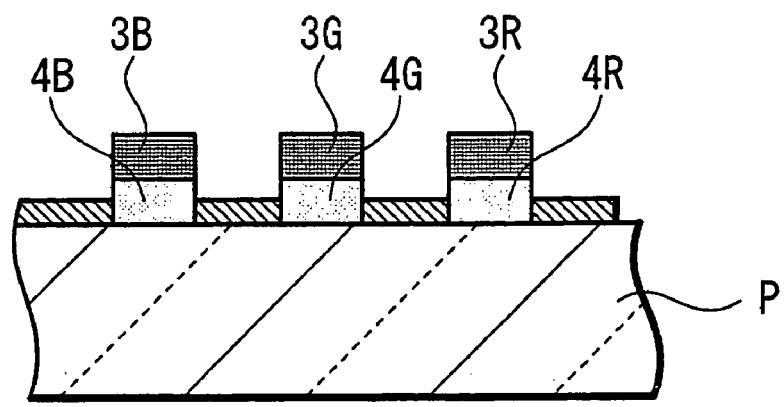

Thereafter, the resulting product is developed by warm water at a temperature ranging of from 20 to 25 ° C. and thereby the non-exposed portions on the blue pixel, the green pixel and the photoabsorption layer 21 are completely removed and dried, thereby resulting in the red pixel composed of the red color filter layer 4R and the red fluorescent substance layer 3R being formed as shown in FIG. 6B.

Next, after an acrylic resin has been coated on the fluorescent substance layers of the blue pixel, the green pixel and the red pixel formed by this thermosensitive transfer film F to smoothen the surfaces of the fluorescent substance layers, a metal-back layer is formed on the surface by vapor-deposition of aluminum or transfer process.

After that, the display panel P and a funnel glass (not shown) are attached with application of heat, and hence a color cathode-ray tube can be manufactured. In this process in which the display panel P and the funnel glass are attached with application of heat, organic materials are completely burnt down.

In the color cathode-ray tube with the thus manufactured color filter layers 4B, 4G, 4R, external light is absorbed by the color filter layers 4B, 4G, 4R and intensity of reflected light decreases so that a contrast of the color cathode-ray tube increases. In addition, when the display panel P is made of glass having high transmittance, it becomes possible to increase a brightness of the color cathode-ray tube.

Also, when the thermosensitive transfer film F is used as described above, since the color filter layers 4B, 4G, 4R and the fluorescent substance layers 3B, 3G, 3R can be formed by only the transfer, exposure, development and drying processes, the manufacturing process can be simplified remarkably as compared with the related-art slurry method.

Since a burden imposed upon the photoabsorption layer 21 can be decreased by the decrease of the number of processes as compared with the related-art slurry method, the occurrence of defect of the photoabsorption layer 21 can decrease. Accordingly, the color filter layers 4B, 4G, 4R and the fluorescent substance layers 3B, 3G, 3R obtained by the above-mentioned manufacturing method are satisfactory in pattern accuracy, and hence the occurrence of defect can be improved remarkably. Further, since a possibility in which dusts and a foreign matter will be mixed into the color filter layers 4B, 4G, 4R and the fluorescent substance layers 3B, 3G, 3R can decrease, defects caused by these factors become difficult to occur.

INVENTIVE EXAMPLES

Inventive examples of the adhesive agent layers corresponding to blue in the thermosensitive transfer film according to the embodiment of the present invention will be described below together with comparative examples. The following table 1 shows inventive examples and comparative examples of the adhesive agent layers corresponding to blue from a prescription standpoint.

TABLE 1

|  | Inventive example 1 | Inventive example 2 | Comparative example 1 | Comparative example 2 |
| --- | --- | --- | --- | --- |
| Photosensitive resin | PVA-azide resin 3 parts by weight | PVA-azide resin 10 parts by weight | PVA-azide resin 10 parts by weight | PVA-azide resin 10 parts by weight |
| Adhesive agent resin | Water-soluble polyamide resin 25 parts by weight | Water-soluble polyamide resin 20 parts by weight | Water-soluble acrylic resin 20 parts by weight | Vinyl acetate emulsion 20 parts by weight |
| Water-soluble resin | Water-soluble polyol 7 parts by weight | Water-soluble polyol 5 parts by weight | Water-soluble polyol 5 parts by weight | Polyvinyl pyrrolidone 5 parts by weight |
| Inorganic coloring pigment | 65 parts by weight | 65 parts by weight | 65 parts by weight | 65 parts by weight |

Inventive Example 1

An adhesive agent layer according to the inventive example 1 is produced by mixing 3 parts by weight (3 weight %) of a PVA-azide resin as a photosensitive resin, 25 parts by weight (25 weight %) of a water-soluble polyamide resin as an adhesive resin, 7 parts by weight (7 weight %) of a water-soluble polyol as a water-soluble resin and 65 parts by weight (65 weight %) of an inorganic coloring pigment. When this adhesive layer is in use, a satisfactory pattern can be formed by thermal transfer, exposure and water development.

Inventive Example 2

An adhesive agent layer according to the inventive example 2 is produced by mixing 10 parts by weight (10 weight %) of a PVA-azide resin as a photosensitive resin, 20 parts by weight (20 weight %) of a water-soluble amide resin as an adhesive agent resin, 5 parts by weight (5 weight %) of a water-soluble polyol as a water-soluble resin and 65 parts by weight (65 weight %) of an inorganic coloring pigment. Although this, adhesive agent layer requires exposure energy larger than that of the inventive example 1 (the inventive example 1 needs exposure energy of 20 mJ/cm$^2$ and the inventive example 2 needs exposure energy of 40 mJ/cm$^2$), a satisfactory pattern can be formed by thermal transfer, exposure and water development.

Comparative Example 1

An adhesive agent layer according to the comparative example 1 is produced by mixing 10 parts by weight (10 weight %) of a PVA-azide resin as a photosensitive resin, 20 parts by weight (20 weight %) of a water-soluble acrylic resin as an adhesive agent resin, 5 parts by weight (5 weight %) of a water-soluble polyol as a water-soluble resin and 65 parts by weight (65 weight %) of an inorganic coloring pigment. In this adhesive agent layer, the inorganic pigment tends to aggregate, and hence a problem arises in spectral transmittance property. This comparative example 1 is inferior to the inventive examples 1 and 2 in water development property.

Comparative Example 2

An adhesive agent layer 2 according to the comparative example 2 is produced by mixing 10 parts by weight (10 weight %) of a PVA-azide resin as a photosensitive resin, 20 parts by weight (20 weight %) of a vinyl acetate emulsion as an adhesive agent resin, 5 parts by weight (5 weight %) of polyvinyl pyrrolidone as a water-soluble resin and 65 parts by weight (65 weight %) of an inorganic coloring pigment. In this adhesive agent layer, the dried coated film is high in hase and a spectral transmittance property becomes insufficient. In this case, it is possible to form the pattern by water development.

When the adhesive agent layer is generally produced by mixing at least the pigment, the thermosensitive adhesive agent and the photosensitizer, it is very difficult to well balance floor filter characteristic (spectral transmittance property), transfer property (thermal transfer property to the glass) and the pattern forming property based upon water development by a single layer. According to the inventive examples, these properties can be well balanced by the single layer.

First, in order to realize the spectral transmittance property at the high level, emulsions of a thermosensitive adhesive agent (vinyl acetate, acryl-based resin, etc.) which are generally used cannot be used. That is, the emulsion resin increases hase of a baked color filter and lowers the spectral transmittance property.

In order to solve this problem, the inventive examples use water-soluble resins as materials other than the coloring pigment. In particular, selection of component of the adhesive agent resin (thermosensitive adhesive agent) is an important point, and hence a water-soluble acrylic resin (comparative example 1), a PVA resin and the like have been tested so far. It is to be understood that adhesive property and pattern forming property obtained when the water-soluble polyamide resin (inventive examples 1, 2) is in use are well balanced.

Since the above-mentioned components are not sufficient in water development property, we have examined so far various water-soluble resins which are useful as minor-role water-soluble resins. It was to be understood that it is effective to mix a small amount of water-soluble polyol to the above-mentioned components. Thus, water development property can be improved considerably, and pattern forming property can be stabilized.

In addition, with respect to exposure sensitivity, selection of an azide-based photosensitive resin of PVA-backbone is an important point. The exposure sensitivity can be adjusted by selection of a polymerization degree of a PVA resin and an added ratio of azide group.

While the color cathode-ray tube has been described so far as the display device in the above-described embodiments, the present invention is not limited thereto. When the present invention is applied to other display devices than the color cathode-ray tube, for example, a plasma display panel (PDP) or a field emission display (FED), fluorescent substance layers may be formed between ribs formed on a PDP panel with application of the thermosensitive transfer film and the display device manufacturing method according to the embodiments of the present invention.

As set forth above, according to the present invention, the following effects can be achieved. That is, since the adhesive agent layer and the color filter layer can be formed as one body (single layer) and the thickness of the thermosensitive transfer film can decrease, it becomes possible to improve work efficiency of transfer process. Furthermore, since the adhesive agent layer and the color filter layer are formed as one body, the exposure light is attenuated by only the fluorescent substance layer, it becomes possible to make sharp patterning. As a result, it becomes possible to remarkably improve color purity and contrast of the display device.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A display device manufacturing method comprising the steps of:
   forming pattern by exposure and development after a fluorescent substance layer and an adhesive agent layer have been transferred from a thermosensitive transfer film onto the inner surface of a display panel, and
   wherein said thermosensitive transfer film comprises a base film, the fluorescent substance layer, and the adhesive agent layer, and wherein the adhesive agent layer comprises a thermosensitive adhesive agent and a photosensitizer, said thermosensitive adhesive agent including a pigment corresponding to color of said fluorescent substance layer and said photosensitizer, said adhesive agent layer transferred onto the inner surface of said display panel being used as a color filter layer, and wherein said fluorescent substance layer is blue or green in color.

2. The display device manufacturing method of claim 1, wherein said fluorescent substance layer is an electron beam excited fluorescent substance layer.

3. A thermosensitive transfer film comprising:
   a base film,
   a fluorescent substance layer,
   a thermosensitive adhesive agent including a pigment corresponding to color of said fluorescent substance layer and a photosensitizer on the base film,
   wherein said fluorescent substance layer adapted to contact an adhesive agent layer, said adhesive agent layer being between portions of a patterned photoabsorption layer at a pixel location, and
   wherein said patterned photoabsorption layer is on a surface of a display panel.

4. The thermosensitive transfer film according to claim 3, wherein said adhesive agent layer is on said patterned photoabsorption layer and said display panel.

5. The thermosensitive transfer film according to claim 3, further comprising:
   a cushion layer between said base film and said fluorescent substance layer.

6. The thermosensitive transfer film according to claim 3, wherein said fluorescent substance layer is in contact with said adhesive agent layer.

7. The thermosensitive transfer film according to claim 3, wherein said fluorescent substance layer is made of a fluorescent material, said fluorescent material being adapted to emit light at a color.

8. The thermosensitive transfer film of claim 3, wherein said fluorescent substance layer is an electron beam excited fluorescent substance layer.

* * * * *